United States Patent Office 3,292,798
Patented Dec. 20, 1966

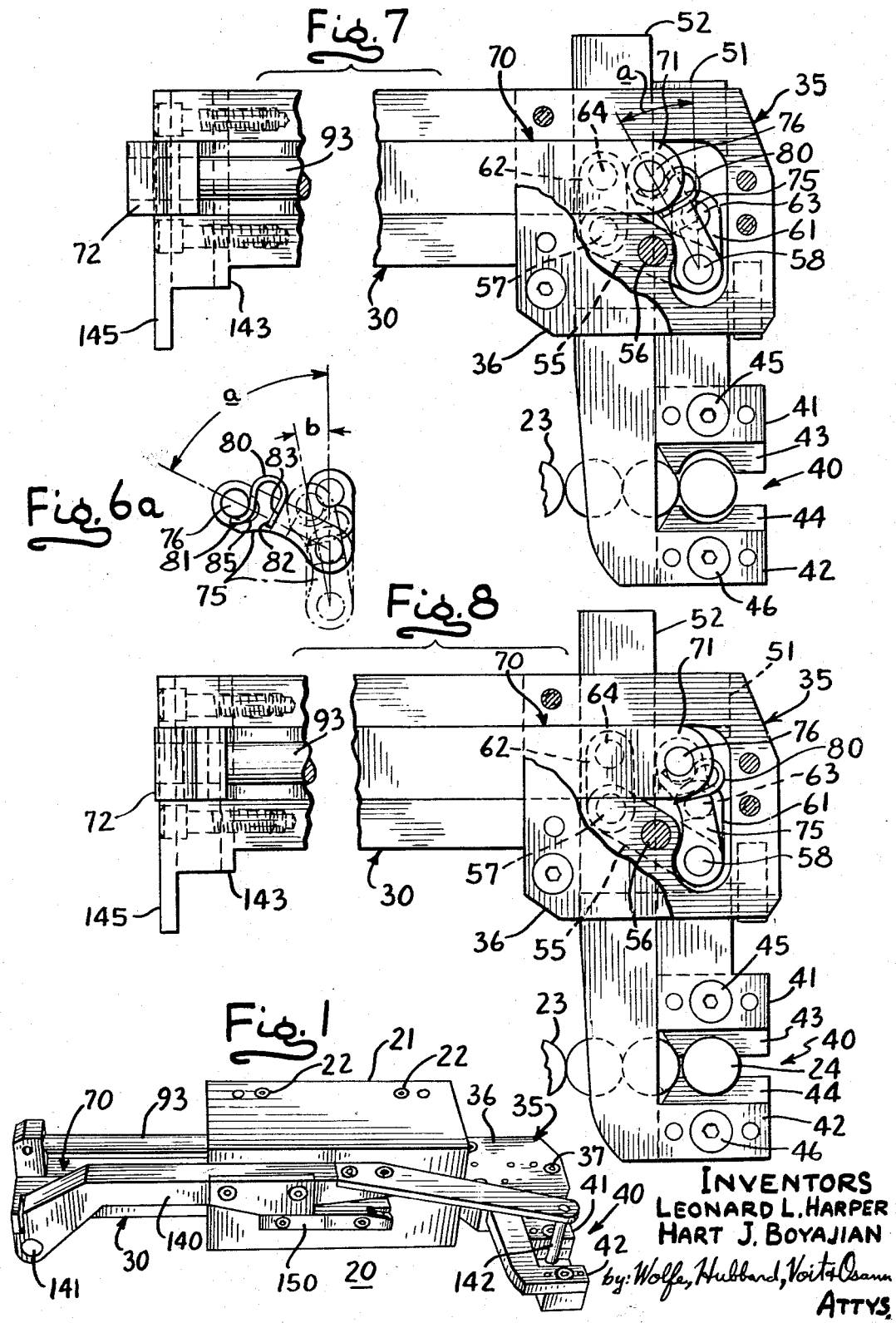

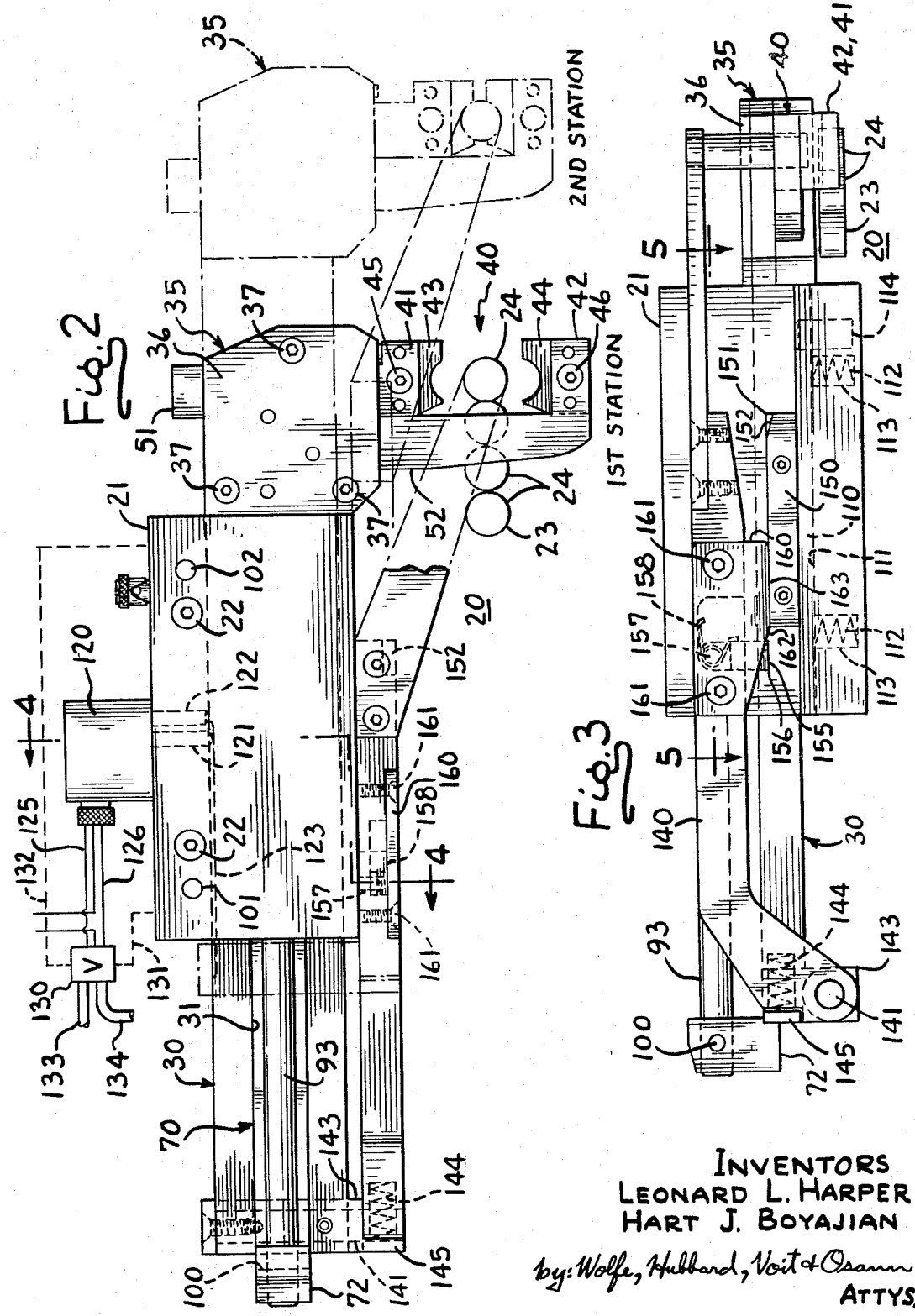

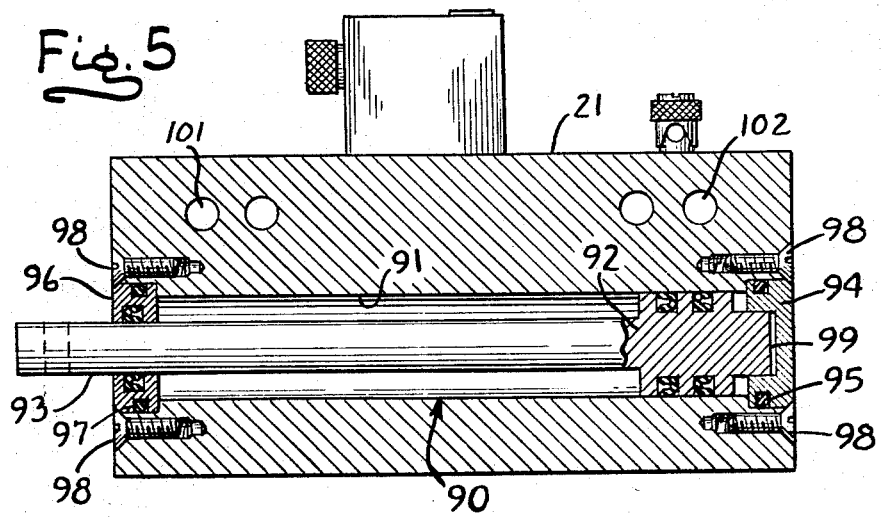
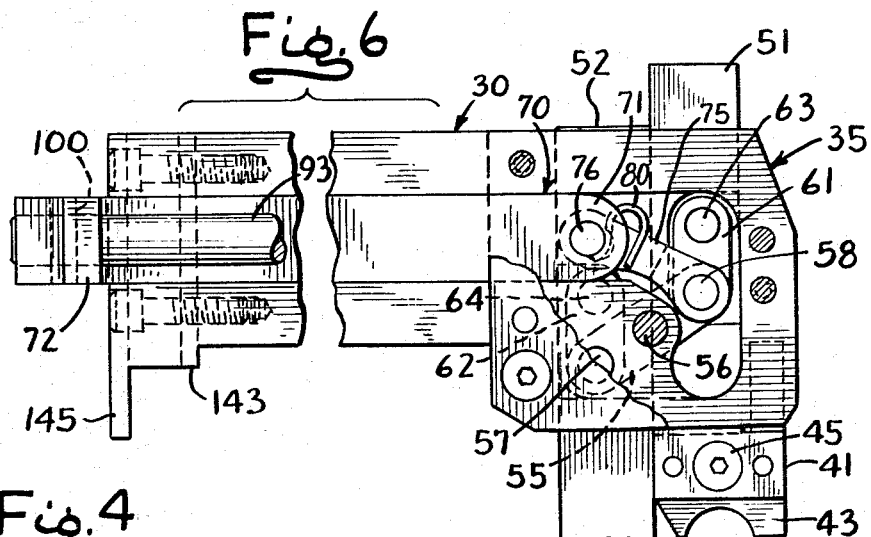
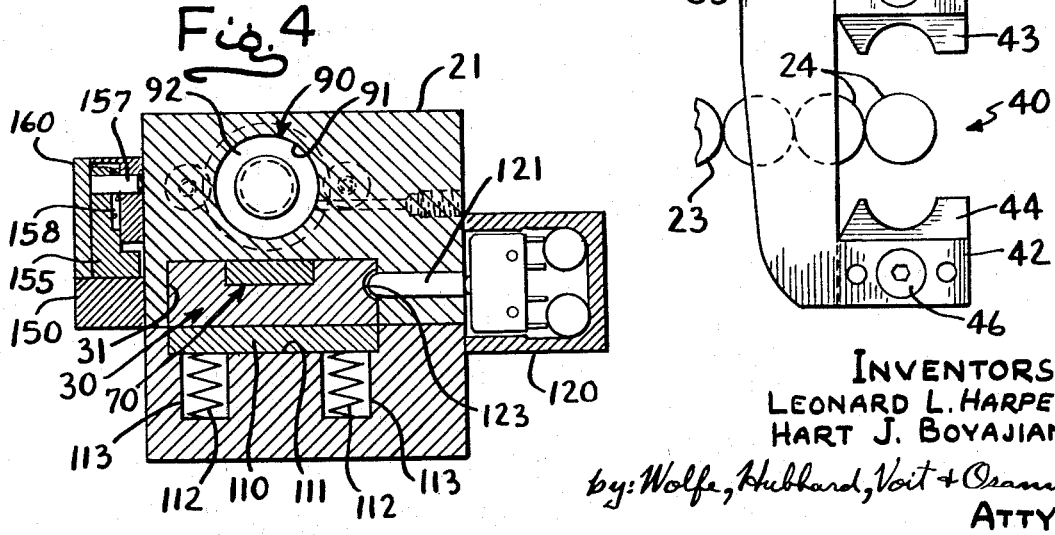

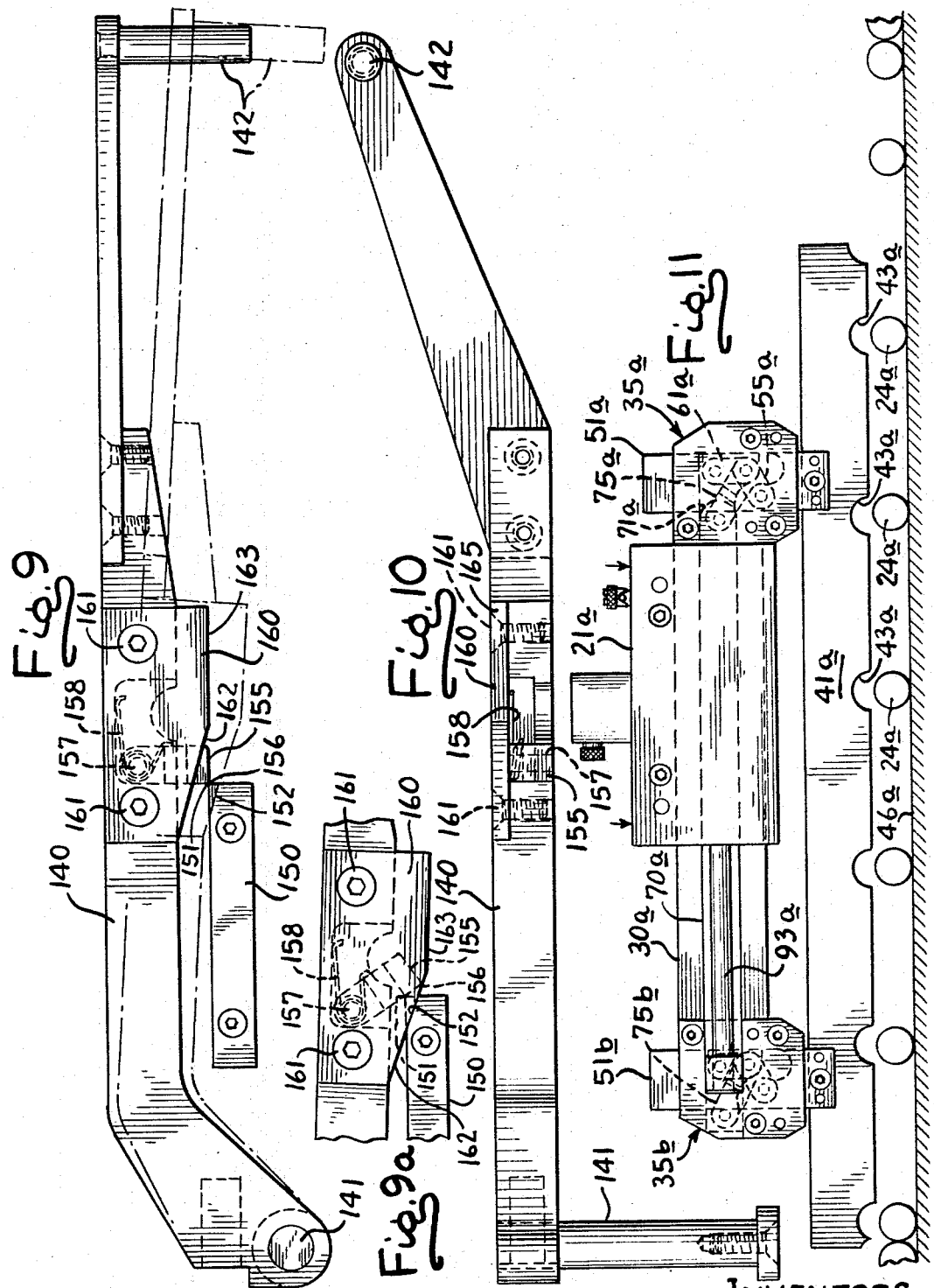

3,292,798
LINEAR TRANSPORT AND PLACEMENT
DEVICE FOR A WORKPIECE
Leonard L. Harper and Hart J. Boyajian, both of
7338 N. Lawndale, Chicago, Ill. 60600
Filed Nov. 10, 1964, Ser. No. 410,061
12 Claims. (Cl. 214—1)

The present invention relates to mechanisms for gripping and moving a workpiece between successive work stations of automated production lines.

It is an object of the invention to provide a device which is capable of grasping a workpiece at a first station and transporting it along a linear path for placement in a second station where the workpiece is released. It is a more specific object to provide a positioning and placement mechanism for a workpiece which reciprocates between first and second work stations and which includes means for positively ejecting the workpiece at the second station.

It is another object of the invention to provide a transport and placement mechanism which is of general utility and which may be employed wherever it is desired to transport a workpiece between successive positions and which may be readily accommodated to workpieces of different size and shape and to different station-to-station spacings. In this connection it is an object to provide a workpiece transport and placement assembly which is unitary and self-contained and which may be employed in multiple between successive stations in an automated production line. It is therefore an object of the invention to provide an assembly which may be of standardized construction and which may be economically manufactured at a low per unit price with only minor and inexpensive modification being required to adapt the unit to the size and shape of the workpiece in its various stages up to the completed product. In this connection it is an object to provide a transport and placement assembly for a production line which may be repeatedly reused with minor adaptation in different production lines or which may be easily modified to accommodate change or improvement in the product.

It is a more specific object to provide a transport and placement mechanism which is simply constructed but which insures that the part is gripped firmly, yet resiliently, transported sequentially following the gripping action, and released promptly at the end of the advancing stroke and prior to the beginning of the return stroke. In this connection it is an object to provide a transport and placement mechanism which is both accurate and reliable and which performs consistently over thousands of operations with minimum risk of mis-timing or breakdown.

It is another more specific object to provide a transport and placement device for a workpiece which includes a toggle for the purpose of developing a large clamping force with only a small actuating force and thereby to insure that clamping of the workpiece occurs at the first station prior to transport to the respective stations and so that release of the workpiece occurs at the second station prior to return of the clamping jaws to the first station.

It is still another object of the present invention to provide a transport and placement mechanism which is durable and long lived but in which the movable elements are nevertheless constructed so as to enable reciprocation at high repetitive rates, for example, rates on the order of five cycles per second or even higher.

Other objects and advantages of the invention will become apparent upon reading the attached description and upon reference to the drawings in which:

FIGURE 1 is a perspective view of a transport and placement device constructed in accordance with the present invention;

FIG. 2 is a top view of the device shown in FIG. 1 with the slide and jaws retracted;

FIG. 3 is a right side view of the device shown in FIG. 2;

FIG. 4 is a transverse section through the body and air cylinder taken along the line 4—4 in FIG. 2;

FIG. 5 is a horizontal section through the air cylinder taken along the line 5—5 in FIG. 3;

FIG. 6 is a top view of the slide assembly partly diagrammatic and with cover plate partially removed showing the slide and jaws retracted;

FIG. 6a is a fragment showing the change in the angling of the toggle link;

FIG. 7 is a stop motion view similar to FIG. 6 but showing the jaws almost closed;

FIG. 8 is a further stop motion view showing the jaws completely closed and with the slide assembly in motion to transport the part forwardly;

FIG. 9 is a fragmentary side view of the ejecting and feeding means at point of dropoff when the slide reaches its extreme position;

FIG. 9a is a fragment showing a portion of the mechanism shown in FIG. 9 to illustrate the upward camming movement which occurs on the return stroke;

FIG. 10 is a bottom view of FIG. 9;

FIG. 11 is a top view of the modified form of the device employed for indexing workpieces along the path of movement.

When the invention has been described in connection with certain preferred embodiments, it will be understood that the invention is not to be limited necessarily to such embodiments and that we intend to cover the various alternative and equivalent constructions included within the spirit and scope of the appended claims.

Turning now to the drawings and particularly to FIGS. 1–5 there is disclosed a transport and placement device 20 constructed in accordance with the present invention having a frame or body 21 which may be secured in place by screws 22 to apparatus forming a continuous production line 23 for the handling of workpieces 24. For simplicity, the workpieces 24 have been shown in the form of small cylinders on which operations are performed at successive stations. It will be understood that the present device is not limited to use with workpieces of any particular shape but that workpieces having a wide variety of shapes and sizes may be accommodated with only minor change in the work-engaging elements of the device. In FIG. 2 the two stations in which the device transports the workpieces include a first or loading station where the workpieces are engaged and a second or depositing station where the workpieces are assembled with some other part or subjected to some other operation. Also, for the sake of simplicity, it will be assumed that the operation to be performed at the second station is the seating of the workpiece into a hole or receptacle formed in another part, although such other part has not been illustrated in the drawings.

Extending longitudinally through the body 21 is a main slide 30 in the form of a flat strip-like plate of metal having a longitudinally extending groove 31, for a purpose to be discussed, and carrying at its forward end a head 35 enclosed by a cover plate 36 held in place with screws 37. Projecting laterally from a head 35 is a jaw assembly 40 including a first or inner jaw member 41 and a second or outer jaw member 42 for gripping a workpiece 24, the jaws are preferably fitted with jaw inserts 43, 44 respectively held in place by screws 45, 46 and are of a contour which mates with the shape of the workpieces to be handled.

As shown in FIG. 6 in which the cover plate 36 has been removed to reveal the internal construction, it will be seen that the jaws 41, 42 are formed integrally with jaw slides 51, 52, respectively, which are transversely mounted, side by side, for sliding movement in the head 35.

For moving the jaw slides equally but in opposite directions a rocking member or lever 55 is provided which is mounted on a central pivot 56 which depends from the cover plate and which has end pivots 57, 58. Connecting links 61, 62, which are pivotally anchored to the jaw slides 51, 52 at pivots 63, 64, respectively, serve to couple the rocking lever so that rocking the lever 55 back and forth causes the jaws to move toward and away from one another. Any disparity between the straight line paths of movement of the slide and the arcuate paths of the pivots 57, 58 is taken up by slight lateral swing of the connecting links 61, 62.

In carrying out the invention a power actuator is provided which is connected to the linkage in such a way as to produce closure of the jaws upon the workpiece followed, in sequence, by bodily transport of the workpiece between the stations. Thus, we provide a jaw actuator slide 70 having a forward end 71 which extends into the head 35 and a rear end 72 with a straight portion in between which is recessed within the longitudinal groove 31 formed in the main slide 30. Connecting the forward end of the slide 70 with the rocking lever 55 is a link 75, the link being pinned at 76 to the forward end of the slide and at the pin 58 to the rocking lever. It will be apparent, then, that as the slide 70 is moved forwardly with respect to the main slide 30 on which it is supported, the link 75 presses against one end of the rocking lever 55 causing it to rotate (as seen in FIG. 6) in the clockwise direction. This results in the first jaw slide 51 being pushed outwardly by the connecting link 61 and the second jaw slide 52 being drawn inwardly by the link 62.

In accordance with the present invention the force which is applied to the device for both clamping of the workpiece and for transport is applied to the linkage which operates the jaws and means are provided for inhibiting the movement of the longitudinal slide with respect to the body of the device so that clamping of the workpiece is completed prior to transport. Further in accordance with the invention a toggle link is employed in the linkage which approaches the on-center condition as the jaws close in upon the workpiece enabling a substantial clamping force to be applied to the workpiece even though only a small amount of force is exerted by the actuator which for convenience may be referred to as the actuator clamping force. With the actuator clamping force less than the force which inhibits the movement of the main slide, the clamping is sure to be completed before the main slide begins to move. In other words, the workpiece is sure to be firmly clamped before it is transported. Conversely, at the opposite end of the stroke a reversal in the actuator force is certain to release the clamping jaws before the main slide is moved, against the inhibiting force, back to its initial condition. Further in accordance with the invention the toggle link has an associated spring which is connected effectively in series therewith to limit the clamping force to a desired value and to insure that the clamping force is resiliently applied.

Thus turning more specifically to the drawings the link 75, which is employed in a toggle link, is preferably dimensioned, and positioned, so that it occupies a substantial angle $a$ with respect to the line of movement of the jaw slide 51 when the jaws are in open position with the angle being reduced progressively with movement of the jaw to the point where the ends of the toggle link are substantially in alinement with the slide 51 at the end of the clamping stroke, thereby placing the toggle links substantially on center at the end of the stroke. Preferably, movement of the toggle link is not carried to the point of placing the toggle pivots on dead center, but is stopped short of the dead center position by a shallow angle $b$.

Because of the risk that an excessive force may be built up in the jaws capable of damaging the device or the workpiece which it engages, the toggle link 75 has an associated spring 80, the first end 81 of the spring engaging the pin 76 and the second end 82 of the spring engaging an abutment 83 formed on the link. To permit yielding of the toggle link with respect to the pins 76 at the input end, the pin opening indicated at 85 is elongated as shown (6a) thereby permitting the pivot pin 76 to crowd inwardly upon the link as the jaws bottom on the workpiece.

Prior to considering a typical cycle of operation, attention will be given to the means for applying force to the jaw actuator slide 70 and the means for applying inhibiting force for delaying movement of the slide assembly as a whole in respect to the slide body 21 in which it is mounted. The fluid actuator employed for powering the device is preferably integrally included within the body 21 as shown in FIGS. 4 and 5. Thus, to form the actuator, indicated generally at 90, the body is bored as indicated at 91, to accommodate a piston 92 having a plunger 93. A cap 94 having O-rings 95 seals the dead end of the bore while the plunger end is enclosed by an annular ring 96 having O-rings 97. The cap and ring are held in place in the body by screws 98. The cap may be provided with a recess 99 to provide cushioning at the end of the stroke. The outer end 72 of the slide 70 is connected to the outer end of the plunger by means of an end 100. Air is admitted to the opposite ends of the actuator through inlets 101, 102, respectively.

For the purpose of providing an inhibiting force to delay movement of the main slide 30 until the jaws have operated, a spring pressed plate is provided along the underside of the slide. This plate, indicated at 110 in FIG. 4 is mounted in a recess 111. Springs 112, which may be four in number, and which are mounted in shallow bores 113 formed in the lower portion of the body, press upwardly against the plate 110 providing a frictional drag. The amount of the friction, and hence the amount of the limiting force, is determined by the strength of the springs and the plate 110 is preferably constructed of Oilite or similar permanently lubricated material in order to minimize wear and to insure a relatively constant inhibiting force. The plate is maintained in position by a dowel pin 114. In a practical case springs 113 may be selected to provide an inhibiting force on the order of 10 pounds insuring that a clamping force will be established at a reliably high level, for example 50 pounds, before the main slide begins to move.

For the purpose of applying pressure to the actuator force 101, 102 alternately as the slide reaches the limits of its stroke at the first and second station positions, a limit switch 120 is provided having plungers 121, 122 which ride in a groove 123 formed along the edge of the main slide 30. Since the construction of the limit switch 120 does not form a part of the present invention, it will suffice to say that the effect of the switch is to energize a first line 125 at one end of the stroke and line 126 at the other. These control lines control the setting of the reversing valve 130 having outlet lines 131, 132 and an input line 133 which is connected to a suitable source of pressure fluid. The displaced fluid from the actuator is discharged to a sump via a line 134.

In reversing the operation of the device, it will be assumed that the slide starts from the position shown in FIGS. 2 and 3. It will further be assumed that the switch element coupled to the plunger 122 is turned on causing the valve 130 to feed the pressure fluid to the inlet port 101 of the actuator, exhausting the displaced fluid from the port 102. Since the movement of the slide 30 is inhibited by the pressure of the plate 110, the slide 30 and head 35 remain stationary, movement of the plunger 93 of the actuator to the right causes shifting of the jaw actuator slide 70 to the right as shown in FIG. 6, applying a component of movement to the toggle link 75 which is both downwardly and to the right resulting in clockwise rocking of the lever 55. This movement, transmitted to the slides 51, 52 by the link 61, 62 causes the jaws 41, 42 to move inwardly toward the workpiece 24. As the toggle link is thrust downwardly its angle relative to the line of action of the slide 51 gradually changes; by the time the jaws have moved into the vicinity of the workpiece the angle is reduced to the value $a'$ shown in FIG. 7. After contact takes place between the jaws and the workpiece, continued movement of the slide 70 is taken up by compression of the spring 80 and the toggle undergoes the final portion of its rotation occupying a final angle $b$ in which the toggle link is just short of being alined with the slide 51.

Because of the change in angle of the toggle link, the mechanical advantage of the actuating slide 70 with respect to the jaw slides 51, 52 becomes increasingly favorable as the linkage moves into its final clamping position so that, at the end of the stroke, a large clamping force may be developed by only a small actuating force in the slide 70. This insures that the clamping movement will be completed, and the workpiece will be firmly clamped before a pressure is built up in the actuator which is sufficient to overcome the inhibiting force acting upon the main slide 30.

In accordance with one of the aspects of the present invention, means are provided for ejecting the workpiece into seated position at the second station, i.e., at the end of the stroke. More specifically, an ejecting arm is provided which is pivoted at one end to the main slide and which has an ejecting tip at the other centered with respect to the holding jaws and which is actuated by the cam and cam follower between the arm and the body 21 of the device. Thus, as shown in FIGS. 2, 3, 9, and 10, we provide an ejecting arm 140 having a shaft 141 for pivotal anchoring to the slide 30 and a tip 142. The shaft 141 is preferably journaled in a depending bracket 143 on the underside of the slide 30. The arm is downwardly biased by means of a coil spring 144 which is seated in a bore formed in the arm and which presses outwardly against a stop 145 on the slide.

Means are provided for causing abrupt ejecting movement of the ejector arm at the end of the forward stroke and when the workpiece is positioned at the second, or receiving station, with means for restoring the arm gradually to its upraised position incident to the return stroke of the slide. Abrupt dropoff is provided by a cam block 150 which is secured to the side of the body 21 having a sharp edge 151 and an adjacent ramp surface 152. Mounted on the arm 140 with its path of movement alined with the sharp edge 151 is a pawl 155 having a sharp edge 156. The pawl is mounted upon a pin 157 and is spring biased into a bottomed working position by a spring 158. Thus when the slide 30 moves forwardly, a point is reached as shown in FIG. 9, where the sharp edges 151, 156 reach the point of dropoff causing the ejector arm 140 to be snapped downwardly against the workpiece 24 centered below the ejector tip 142. The downward force is provided by the biasing spring 144 which assists the effect of gravity upon the arm.

Means are provided for effectively disabling the dropoff edges during the return stroke so that the arm is cammed gradually back to its its upraised position. In the present instance, as shown in FIG. 9a the camming is brought about by providing in line with the ramp 152 a cam follower member 160 secured to the arm by screws 161 and having a cam follower surface 162. During the retracting stroke the pawl is wiped into inactive position as shown in FIG. 9a and the cam follower surface 162 simply rides up upon the ramp 152 thereby restoring the arm to its upraised position. Preferably, the supporting surface indicated at 163 on the cam follower member is at a level sufficiently deep to provide return clearance for the pawl 155 permitting the same to snap back into its operating position in readiness for the succeeding cycle.

The device described above has been found to have a number of important operating advantages over prior transport mechanisms. The construction, while durable, is basically light and simple, permitting reciprocation at high repetitive rates. For example, in a practical case reciprocation rates of five operations or more per second may be readily achieved without any substantial sacrifice of reliability. Gripping is positive, placement is precise, and sequential operation of the jaws and slide are effectively interlocked so as to insure complete gripping before the workpiece is moved and complete release before retracting movement begins. Where an ejector arm is provided as part of the operating combination, positive ejection occurs precisely at the end of the forward stroke, with the ejector acting almost instantaneously to overpower the holding force of the jaws and with the downward force of the ejector being completed during the initial portion of the return stroke. Since the dropoff edges 151, 156 are sharp and since dropoff can only occur at the completion of the forward movement, there is every assurance that the workpiece will be properly alined with the pawl or other member which may be provided at the second station to receive or engage it.

While the invention has been described in connection with an ejector carried by a slide and permanently centered with respect to the jaws, it will be apparent to one skilled in the art that the ejector may be permanently mounted at the second station with its operation timed with the arrival of the workpiece at the second station.

In the above paragraphs there has been described a transport and placement device having a pair of cooperating jaws, both of which are movable, which act to grip or release a workpiece in timed sequence with the transporting movement. In accordance with certain aspects of the invention, a single jaw and jaw slide may be provided operated by a toggle link to provide a high mechanical advantage and hence a low operating force to insure sequential operation with an inhibited slide. Such a modified device is shown in FIG. 11 where corresponding reference numerals with the addition of subscript $a$ have been employed to denote corresponding parts. Thus, there is provided a body 21a mounting a slide 30a having a head 35a mounting a jaw member 41a in the form of an elongated rail having individual work receiving jaws 43a. The jaw member is mounted upon a jaw slide 51a which extends transversely in the head engaging a rocking arm or lever 55a having a connecting link 61a. Force for operating the linkage is received via a slide 70a with the latter connected to a toggle link 75a at its forward end. The output end of the toggle is linked to the junction of the two arms 55, 61. Thus, when thrust is applied through the actuating slide 70a, the toggle link 75a crowds downwardly causing the slide 51a and jaw 41a to be extended into engagement with a series of workpieces indicated at 24a.

Simultaneosuly, the rocking of the toggle link clockwise into substantial alinement with the slide and into a position approaching dead center causes a progressive increase and mechanical advantage resulting in a large clamping force. Such force is resisted by a wall diagrammatically indicated at 42a which serves as a reference or guiding surface.

In accordance with one of the more detailed features of the construction shown in FIG. 11, a similar linkage, operated by the slide 70a, is provided at the opposite end of the main slide 30a. For convenience, each of the parts is indicated by a corresponding reference numeral with the addition of subscript $b$. Thus, when the device is in its initial condition the slides 51a, 51b are retracted and the jaw 41a is clear of the workpieces 24a. Applying pressure fluid to the internal actuator produces movement of the plunger 93a producing endwise movement of the slide 70a which operates the toogle link 75a, 75b thrusting the slides 51a, 51b outwardly, thereby captivating the workpieces. A subsequent buildup of pressure in the actuator, overcoming the inhibiting force, causes the slide 30a to move endwise, thus advancing, or indexing, the individual workpieces 24a one step forwardly.

When pressure in the actuator is reversed the toggle links 75a, 75b are released and retracted, thereby retracting the jaw rail 41a into the position clear of the workpiece following which the slide 30a is retracted back to its initial position. A device of this kind, it is found, may operate at a high cyclic rate causing a rapid step by step advancement of workpieces from station to station along a path of movement with operation being performed, if desired, at one or all of the work stations.

The transporting and placing arrangement is of general utility and can be quickly installed, as a unit, anywhere linear advancement is desired in a quantity production line. To adapt the device to a workpiece of a different shape requires simply that the jaw inserts 43, 44 be replaced by inserts of suitable conformation. Moreover, the length of the stroke may be easily adjusted by providing a stop member of suitable dimension on the rear end of the main slide and in position to abut the body 21 to define the end of the stroke.

In the following claims the term "jaw" will be understood to refer to any member suitably shaped for engaging a workpiece. The term "rocking member" while applying to a pivoted lever or arm in the preferred embodiments disclosed, is not necessarily limited thereto and it will be understood by one skilled in the art that it includes within its scope other members capable of undergoing rotational or rocking movement to cause the engaged slides to move in opposite directions. While the preferred embodiment employs an integral or self-contained actuator, it will be understood by one skilled in the art that the invention is not limited thereto and if desired a separate or outboard actuator, secured with respect to the body 21, may be employed.

We claim as our invention:

1. In a transport and placement device for moving a small workpiece from a first position to a second position, the combination comprising a slide body, a slide assembly having a longitudinal slide mounted in the body and having a head at one end, jaw slides transversely mounted side by side in the head and carrying opposed jaws, a rocking lever centrally pivoted in the head coupled at its ends to the jaw slides for movement of the jaws toward and away from one another, a jaw actuator carried by the longitudinal slide and coupled at one end to the rocking lever, said slide body having a fluid actuator parallel to the longitudinal slide, said fluid actuator having a plunger coupled to the jaw actuator, and means for inhibiting the movement of the longitudinal slide in the body so that when the plunger of the fluid actuator is extended movement of the jaw actuator rocks the rocking lever to close the jaws on a workpiece at the first station followed in sequence by bodily movement of the longitudinal slide for transport of the workpiece to a second station.

2. In a transport and placement device for moving a small workpiece from a first station to a second station, the combination comprising a slide body, a slide assembly having a longitudinal slide mounted in the body and having a head at one end, jaw slides transversely mounted side by side in the head and carrying opposed jaws, a rocking lever centrally pivoted in the head and coupled at its ends to the jaw slides for movement of the jaws toward and away from one another, a jaw actuator carried by the longitudinal slide and coupled at one end to the rocking lever, said slide body having a fluid actuator parallel to the longitudinal slide, said fluid actuator including a plunger coupled to the jaw actuator and having forward and reverse fluid ports at its ends for driving of the plunger in opposite directions, a reversing valve for feeding pressure fluid to the ports, means for inhibiting the movement of the longitudinal slide in the body so that when the plunger moves in one direction the rocking lever rocks the jaws closed on the workpiece followed sequentially by movement of the workpiece from the first station to the second station and so that when the plunger is moved in the reverse direction the rocking lever rocks the jaws open followed sequentially by return movement of the jaws to the first station in readiness for engaging the successive workpiece.

3. In a transport and placement device for moving a small workpiece from a first station to a second station in an automated production line, the combination comprising a slide body, a slide assembly having a longitudinal slide mounted in the body and having a head at one end, jaw slides transversely mounted side by side in the head and carrying opposed jaws, a rocking member centrally pivoted in said head and coupled to the jaw slides at points on opposite sides of the pivot for movement of the jaws toward and away from one another, a jaw actuator carried by the longitudinal slide and coupled at one end to the rocking member, said slide body having a fluid actuator parallel to the longitudinal slide, said fluid actuator including a plunger coupled to the jaw actuator, and means for inhibiting the movement of the longitudinal slide in the body so that when the plunger is moved in one direction the jaws close followed by bodily movement of the slide for transport of the workpiece from the first station to the second and so that when the plunger is moved in the opposite direction the jaws open followed sequentially by return of the slide to its initial position.

4. In a transport and placement device for moving a small workpiece from a first station to a second station in an automated production line, the combination comprising a slide body, a slide assembly having a longitudinal slide mounted in the body and having a head at one end, jaw slides transversely mounted side by side in the head and carrying opposed jaws, a rocking lever centrally pivoted in the head and coupled at its ends to the jaw slides for movement of the jaws toward and away from one another, a jaw actuator slide carried by the longitudinal slide parallel thereto, said slide body having a fluid actuator parallel to the longitudinal slide, said fluid actuator having a plunger coupled to the jaw actuator slide, a link at the opposite end of the jaw actuator slide for connecting the same to the rocking lever, and means for inhibiting the movement of the longitudinal slide in the body so that when the fluid actuator is energized, movement of the jaws takes place first followed by movement of the longitudinal slide, the link interconnecting the jaw actuator slide and the rocking lever being in the form of a toggle link which is arranged to move progressively toword its on-center position as the jaws approach the closed position thereby to develop a closing force at the jaw which substantially exceeds the force in the jaw actuating slide.

5. In a transport and placement device for moving a small workpiece from a first station to a second station in an automated production line, the combination comprising a slide body, a slide assembly having a longitudinal slide mounted in the body and having a head at one end, jaw slides transversely mounted side by side in the head and carrying opposed jaws, a rocking member centrally pivoted in the head and coupled at its ends to the jaw slides for movement of the jaws toward and away from one another, said slide body having a fluid actuator parallel to the longitudinal slide, said fluid actuator having a plunger, means including a toggle link for coupling the plunger to the rocking member, means for inhibiting the movement of the longitudinal slide in the body so that upon pressurizing the fluid actuator the jaws are operated followed by bodily movement of the longitudinal slide, said toggle link having an associated spring effectively in series therewith to effect resilient gripping by the jaws.

6. In a transport and placement device for moving a small workpiece from a first station to a second station in an automated production line, the combination comprising a slide body, a slide assembly having a longitudinal slide mounted in the body and having a head at one end, jaw slides transversely mounted side by side in the head and carrying jaws, a rocking member centrally pivoted in the head and coupled at its ends to the jaw slides for movement of the jaws toward and away from one another, a jaw actuator slide carried by the longitudinal slide and having its forward end extending into the head to a position adjacent the rocking member, a link coupling the forward end of the jaw actuator slide to the rocking member, said slide body having a fluid actuator parallel to the longitudinal slide, said fluid actuator having a plunger coupled to the jaw actuator slide, and means for inhibiting the movement of the longitudinal slide in the body, said link being in the form of a toggle link arranged to move progressively toward its on-center position as the jaws come completely closed so that a relatively light force in the jaw actuator slide suffices to provide a large clamping force at the jaws and so that a relatively small amount of inhibiting force suffice to insure positive closing of the jaws followed by sequential movement of the longitudinal slide.

7. In a transport and placement device for moving a small workpiece from a first station to a second station in an automated production line, the combination comprising a slide body, a slide assembly having a longitudinal slide mounted in the body and having a head at one end, jaw slides transversely mounted side by side in the head and carrying opposed jaws, a rocking lever centrally pivoted in the head for movement in the plane parallel to the jaw slides and having short connecting links at its ends for connection to the respective jaw slides for movement of the jaws toward and away from one another, a jaw actuator slide carried by the longitudinal slide and having a forward end projecting into the head to a position adjacent the rocking lever, a toggle link interposed between the forward end of the jaw actuator slide and the rocking lever so arranged that the toggle link moves into substantially on-center position as the jaws come into bottoming engagement, said toggle link having an associated spring so that the workpiece is held resiliently clamped during transport to the second station.

8. In a transport and placement device for moving a small workpiece from a first station to a second station in an automated production line, the combination comprising a slide body, a slide assembly having a longitudinal slide mounted in the body and having a head at one end, jaw slides transversely mounted side by side in the head and carrying opposed jaws, a rocking member centrally pivoted in the head and coupled at its ends to the jaw slides for movement of the jaws toward and away from one another, said slide body having a fluid actuator parallel to the longitudinal slide, said fluid actuator having a plunger coupled to the rocking member, means for inhibiting the movement of the longitudinal slide in the body so that when pressure is applied in the actuator jaws close on the workpiece at the first station followed by transport of the workpiece to the second station, and means actuated incident to the slide's reaching its extended position at the second station for positively ejecting the workpiece from between the jaws and into a seated position at the second station.

9. In a transport and placement device for moving a small workpiece from a first station to a second station in an automated production line, the combination comprising a slide body, a slide assembly having a longitudinal slide mounted in the body and having a head at one end, jaw slides transversely mounted side by side in the head and having opposed jaws at the ends thereof, a rocking member centrally pivoted in said head and coupled at its ends to the jaw slides at points on opposite sides of the pivot for movement of the jaws toward and away from one another, said slide body having a fluid actuator parallel to the longitudinal slide and having a plunger coupled to the rocking member so that when the actuator is pressurized the jaws close followed by bodily movement of the longitudinal slide, said longitudinal slide having an ejector arm which is pivoted to the longitudinal slide at one end and which carries an ejector tip at the other centered with respect to the jaws, and means including a cam and cam follower interposed between the ejector arm and the slide body so positioned that the ejector tip comes into ejecting engagement with the workpiece incident to arrival of the workpiece at the second station for forcible ejection of the workpiece at said second station.

10. In a transport and placement device for moving a small workpiece from a first station to a second station in an automated production line or the like, the combination comprising a slide body, a slide assembly having a longitudinal slide mounted in the body and having a head at one end, a transverse jaw slide in said head having a workpiece engaging jaw at its outer end for engaging one side of a workpiece, means for engaging the other side of the workpiece so that the workpiece is clamped by the jaw, a rocking lever pivoted in said head and having a connecting link for connecting it to the jaw slide, a jaw actuator slide carried by the longitudinal slide and having a forward end which extends into the head to the position adjacent the rocking lever, said slide body having a fluid actuator parallel to the longitudinal slide, a link interconnecting the forward end of the jaw actuator slide and the rocking lever, said fluid actuator having a plunger coupled to the jaw actuator slide, means for inhibiting the movement of the longitudinal slide in the body, said link being in the form of a toggle link arranged to move substantially on-center as the jaw is closed on the workpiece and having an associated spring effectively in series therewith so that the workpiece is resiliently clamped by the jaw upon exerting against the jaw actuator slide a force which is substantially less than the inhibiting force thereby to insure that the clamping and bodily movement of a workpiece takes place in sequence as the actuator is pressurized.

11. In a transport and placement device for moving a small workpiece from a first station to a second station in an automated production line or the like, the combination comprising a slide body, a slide assembly having a longitudinal slide mounted in the body and having a head at one end, a transverse jaw slide in said head having a workpiece engaging jaw at its outer end for engaging one side of a workpiece, means for engaging the other side of the workpiece so that the workpiece is clamped by the jaw, a rocking lever pivoted in said head and having a connecting link for connecting it to the jaw slide, a jaw actuator slide carried by the longitudinal slide and having a forward end which extends into the head to the position adjacent the rocking lever, said slide body having a fluid actuator parallel to the longitudinal slide, a link interconnecting the forward end of the jaw actuator slide and the rocking lever, said fluid actuator having a plunger coupled to the jaw actuator slide, means for inhibiting the movement of the longitudinal slide in the body, said link being in the form of a toggle link arranged to move substantially on-center as the jaw is closed on the workpiece and having an associated spring effectively in series therewith so that the workpiece is resiliently clamped by the jaw upon exerting against the jaw actuator slide a force which is substantially less than the inhibiting force thereby to insure that the clamping and bodily movement of a workpiece takes place in sequence as the actuator is pressurized, and valve means controlled by the slide for reversing the pressure in the actuator at the respective limits of movement of the slide.

12. In a transport and placement device for moving a small workpiece from a first station to a second station in an automated production line or the like, the combination comprising a slide body, a slide assembly having a longitudinal slide mounted in the body and having a head at one end, a jaw slide transversely mounted for sliding movement in said head and carrying a jaw at its outer end for engaging one side of a workpiece, means for holding the workpiece as it is engaged by the jaw, a jaw actuator slide carried by the longitudinal slide and generally coextensive with it, a fluid actuator in the slide body arranged parallel to the longitudinal slide and having a plunger, said jaw actuator slide having a forward end extending into said head into a position adjacent the jaw slide and having its rear end connected to the end of the plunger, a toggle link interconnecting the forward end of the jaw actuator slide and the jaw slide so that upon endwise movement of the jaw actuator slide the toggle link moves the jaw slide outwardly with respect to the head with the toggle link simultaneously being moved from a first position in which it bears a substantial angle with respect to the jaw slide and a second position in which the toggle link is substantially in alinement with the jaw slide thereby producing a condition of high mechanical advantage in which the force at the jaw substantially exceeds the force in the jaw actuator slide, a spring associated with the toggle link and effectively in series therewith so that the workpiece is resiliently clamped and tending to limit the maximum clamping force exerted on the workpiece, means for applying an inhibiting force opposing movement of the longitudinal slide with respect to the slide body, such force being in excess of the force required in the jaw actuator slide to produce the clamping of the workpiece thereby to insure that clamping and transport occur in well defined sequence, and means for reversing the pressure of the actuator for release of the jaw followed sequentially by retraction of the longitudinal slide.

References Cited by the Examiner

UNITED STATES PATENTS 2,899,043   8/1959   Young.

FOREIGN PATENTS 106,940   3/1943   Sweden.

MARVIN A. CHAMPION, *Primary Examiner.*